(12) United States Patent
Weiner

(10) Patent No.: US 7,564,586 B1
(45) Date of Patent: Jul. 21, 2009

(54) METHOD, SYSTEM AND COMPUTER PROGRAM FOR COMPRESSING AND TRANSMITTING IMAGE RASTER DATA

(75) Inventor: Helmut Weiner, Munich (DE)

(73) Assignee: Oce Printing Systems GmbH, Poing (DE)

( * ) Notice: Subject to any disclaimer, the term of this patent is extended or adjusted under 35 U.S.C. 154(b) by 510 days.

(21) Appl. No.: 10/009,539

(22) PCT Filed: Apr. 28, 2000

(86) PCT No.: PCT/EP00/03850

§ 371 (c)(1),
(2), (4) Date: Oct. 29, 2001

(87) PCT Pub. No.: WO00/67465

PCT Pub. Date: Nov. 9, 2000

(30) Foreign Application Priority Data

Apr. 29, 1999 (DE) ................. 199 19 624

(51) Int. Cl.
*H04N 1/40* (2006.01)
*G06K 15/00* (2006.01)

(52) U.S. Cl. ............... 358/3.01; 358/3.13; 358/3.24
(58) Field of Classification Search ............. 358/2.1, 358/3.01, 3.08, 3.13, 3.23, 3.24, 534; 382/176
See application file for complete search history.

(56) References Cited

U.S. PATENT DOCUMENTS

| | | | | |
|---|---|---|---|---|
| 4,032,978 A * | 6/1977 | Wong | ............ | 358/3.23 |
| 4,652,935 A * | 3/1987 | Endoh et al. | ............ | 358/426.11 |
| 4,758,897 A * | 7/1988 | Hiratsuka et al. | ............ | 358/3.08 |
| 5,018,024 A | 5/1991 | Tanioka | ............ | 358/2.1 |
| 5,073,953 A | 12/1991 | Westdijk | ............ | 382/176 |
| 5,465,173 A | 11/1995 | Ishikawa et al. | ............ | 358/534 |
| 5,526,469 A * | 6/1996 | Brindle et al. | ............ | 358/1.9 |
| 5,649,073 A * | 7/1997 | Knox et al. | ............ | 358/1.9 |
| 5,745,249 A * | 4/1998 | Crean et al. | ............ | 358/3.06 |
| 5,822,451 A * | 10/1998 | Spaulding et al. | ............ | 382/162 |
| 5,898,821 A * | 4/1999 | Brandkamp | ............ | 358/3.06 |
| 5,940,584 A * | 8/1999 | Zufle | ............ | 358/1.15 |
| 5,949,964 A * | 9/1999 | Clouthier et al. | ............ | 358/3.06 |

FOREIGN PATENT DOCUMENTS

DE   1 527 394   10/1978

(Continued)

OTHER PUBLICATIONS

Japanese Abstract, 11065793 A., Inagaka Tatsuya, Mar. 9, 1999.
William T. Crocca, et al., Xerox Disclosure Journal, vol. 15, No. 6, (1990), "Compression of Grey Digital Images Using Grey", pp. 481-482.

(Continued)

*Primary Examiner*—James A Thompson
(74) *Attorney, Agent, or Firm*—Schiff Hardin LLP

(57) ABSTRACT

A method and system for printing of gray scale images utilizes raster image data. A page is divided into tiles in a two dimensional grid. Tiles are checked for the presence of dither cells for generating gray scale values. Tiles without dither cells are compressed for transmission while tiles having dither cells are not compressed.

50 Claims, 8 Drawing Sheets

FOREIGN PATENT DOCUMENTS

| | | | |
|---|---|---|---|
| DE | 29 53 109 C2 | 12/1980 |
| DE | 38 24 717 C2 | 2/1989 |
| DE | 38 24717 A1 | 2/1989 |
| DE | 41 27 920 C2 | 4/1992 |
| DE | 42 15 157 A1 | 1/1993 |
| EP | 0 683 599 A1 | 11/1995 |
| EP | 0 774 858 A2 | 5/1997 |
| EP | 774858 A2 * | 5/1997 |
| WO | WO 96/09719 | 3/1996 |

OTHER PUBLICATIONS

Das große Data Becker, "Computer Lexikon", (1997) Edition, ISBN 3-8158-1575-4, pp. 191-193.

Computer-Lexikon, Verlag C. H. Beck, Munich, ISBN 3-406-39696-8, (1993) pp. 265-269.

The World of Printers, The Technologies of the High Performance Printers of Océ Printing Systems GmbH, Non-Impact Printing Technologies, ISBN 3-00-001081-5, pp. 6-2 thru 6-10 & 17-6.

* cited by examiner

| | | K | | | Ra | | | | | | | | | Rb | | |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 3 | 3 | 3 | 3 | 3 | 3 | 3 | 3 | 3 | 1 | 1 | 2 | 0 |
| 0 | 0 | 0 | 3 | 3 | 3 | 3 | 3 | 3 | 3 | 0 | 0 | 0 | 1 | 2 | 0 |
| 0 | 0 | 0 | 3 | 3 | 3 | 3 | 3 | 3 | 3 | 0 | 0 | 1 | 1 | 1 | 0 |
| 0 | 0 | 0 | 3 | 3 | 0 | 0 | 0 | 0 | 0 | 0 | 0 | 0 | 0 | 0 | 0 |
| 0 | 0 | 0 | 3 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

Fig.7  S

| | | | | | Ra | | | | | | | | | | |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 3 | 3 | 1 | 1 | 2 | 0 |
| 0 | 0 | 0 | 0 | 0 | 0 | 0 | 0 | 0 | 0 | 0 | 0 | 0 | 1 | 2 | 0 |
| 0 | 0 | 0 | 0 | 0 | 0 | 0 | 0 | 0 | 0 | 0 | 0 | 1 | 1 | 1 | 0 |
| 0 | 0 | 0 | 3 | 3 | 0 | 0 | 0 | 0 | 0 | 0 | 0 | 0 | 0 | 0 | 0 |
| 0 | 0 | 0 | 3 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

Fig.8  S

METHOD, SYSTEM AND COMPUTER PROGRAM FOR COMPRESSING AND TRANSMITTING IMAGE RASTER DATA

BACKGROUND OF THE INVENTION

1. Field of the Invention

The present invention relates to a method for compressing and transmitting image raster data, whereby a data stream of image raster data is generated page-by-page from language elements of a graphics language, the data stream containing gray image areas in the form of dither cells whose gray scale values are determined by model dither cells. The invention also relates to a system for compressing and transmitting image raster data upon employment of the aforementioned method. The invention also relates to a computer system with whose assistance a computer can implement the method.

2. Description of the Related Art

It is not only black/white structures but also gray image areas that have a prescribed gray scale value that are being increasingly being employed when printing text and drawings. When, for example, an RIP module generates a data stream of image raster data page-by-page from language elements of a graphics language, for example the known printer language POSTSCRIPT, a noticeably larger dataset must be processed due to the gray image areas that are produced by dithering. The RIP module (RIP=raster image processing) is generally arranged outside the printer; this means that its image raster data must be compressed in order to be able to transmit the data in time-conforming fashion with a given data transmission rate. The following example makes this clear: A DIN A4 page contains approximately 4.3 megabytes of image raster data given a pixel density of 600 dpi (dots per inch). A high-performance printer has the capability of printing more than 400 DIN A4 pages per minute at 600 dpi. Accordingly, a data rate of more than 28 megabytes/s would have to be governed without compression.

Up to now, the image raster data were compressed with the assistance of a standardized compression method, for example the FAX G4 compression method, and were intermediately stored and/or directly transmitted to the printer in this compressed form. For example, International Patent Application No. PCT/DE95/01293, which claims the priority of German Patent Application No. 44 34 068.0, references compression methods in conjunction with printers. The PCT Application PCT/DE95/01293 is incorporated hereby by reference. When a printed page contains either no or only a few gray raster image areas, the compression time is relatively short and the efficiency of the compression is relatively high. When, however, a page contains a great proportion of gray raster image regions, then the compression time lengthens exponentially and the compression efficiency becomes low.

Picture elements in the form of gray rasters are often generated upon employment of the dithering method. In this dithering method, gray scales are generated by employing dot patterns (rasters). The dithering method exploits a unique property of the human eye: individual picture elements are no longer perceived beyond a specific viewer distance and a specific dot density, but blur to form a gray scale value. A dither cell, accordingly, contains a plurality of picture elements; of which only one picture element, several picture elements or all picture elements of a dither cell are inked dependent on the desired gray scale value. In order to achieve a good melding of the picture elements, the inked picture elements are scattered according to a predetermined algorithm. The gray scale values themselves are fixed by given model dither cells. When a dither cell contains 8×8 picture elements in the form of a matrix and a symmetrical arrangement of the inked picture elements is prescribed, then 32 or 64 gray scale values can be realized. Since dither cells and the distribution of the inked picture elements are relatively complex, standard compression methods for the reduction of the data volume often fail.

Section 6 in *Das Druckerbuch* of Océ Printing Systems GmbH, $3^{rd}$ Edition, 1998, ISBN 3-00-001019-X describes raster technique, whereby a dither technique is also addressed. Among others, the dot pattern method is described as a dither technique. The above document is incorporated herein by reference.

The dithering method is also described in *Das große Data Becker Computer Lexikon*, 1997 Edition, ISBN 3-8158-1575-4, and in *Computer Lexikon*, Verlag C. H. Beck, Munich, ISBN 3-406-39696-8.

U.S. Pat. No. 5,073,953 discloses a method for the automatic segmenting of documents. The picture elements of the document are analyzed according to different types, for example black/white texts, graphics elements, continuous tone images, half-tone images, etc. The document to be analyzed is divided into sub-images and the type is assigned to these sub-images.

Image compression devices are known from German Patent Document DE-C2-38 24 717 and from the publication by W. Crocca et al., "Compression of grey digital images using grey separations", Xerox Disclosure Journal, Vol. 15, No. 6, November/December 1990, pages 481-482. German Patent Document DE-C2-41 27 920 discloses an image processing device wherein image data are subdivided into blocks and the blocks are sequentially processed. German Patent Document DE-C2-29 53 109 and German Patent Document DE-A1-42 15 157 disclose image reception devices. Japanese Patent Document JP-A-11-65793 discloses a method with which data are compressed differently according to the object type (image or text). The contents of the above-cited documents are herewith likewise incorporated by reference into the present specification.

European Patent Document EP 0 774 858 A3 discloses a method for compressing and transmitting image raster data wherein picture elements (pixels) are combined into macro-cells in the fashion of tiles. These macro-cells are assigned to predetermined type classes, for example the type text, graphics, gray scale image, etc. The compression method to be applied is adapted dependent on the information about the type of macro-cell. For compression, the pixels of the respective tile are re-ordered (rescanning), whereby the respectively exposure value of the pixel is defined dependent on the position of the pixel with reference to the center of the macro-cell.

U.S. Pat. No. 5,465,173 is directed to an image processing method wherein half-tone image data are stored. The storing ensues block-by-block with a prescribed plurality of pixel data. A compression of the half-tone image data ensues on the basis of the block-by-block data, whereby the memory requirement is reduced.

SUMMARY OF THE INVENTION

An object of the invention is to provide a method and a system for compressing and transmitting image raster data that also works with high efficiency when a page to be transmitted contains gray picture elements.

This object is achieved by a method for compressing and transmitting image raster data, whereby a data stream of image raster data is generated from language elements of a graphics language, the data stream containing gray image areas in the form of dither cells whose gray scale values are determined by model dither cells, the image raster data of each and every page are divided into tiles of a two-dimensional grid network, whereby each tile comprises a plurality of image raster data, the appertaining model dither cell and the gray scale value thereof being identified for each tile that contains only dither cells, and this tile being marked, and characteristic data of the marked tiles are transmitted for further processing of the image raster data, whereby these characteristic data contain information about the position of the respective tile and the respective gray scale value.

A further improvement provides that the dither cells contain rectangularly or quadratically arranged picture elements, and that the model dither cell with higher gray scale value at least contains inked picture elements at the same positions as the model dither cell with the next-lower gray scale value. Additionally, each tile is checked to see whether is contains dither cells of the type of the model dither cell with the lowest gray scale value. Furthermore, the check of the tiles ensues tile row by tile row, whereby the first row is investigated first per tile; and, given a lack of coincidence, the appertaining tile is investigated no further. In particular, the model dither cell with the highest gray scale value that is contained in all dither cells of a tile is determined for the tile that contains dither cells of the type of the model dither cell with the lowest gray scale value; and the gray scale value of this model dither cell is assigned to this tile.

In one improvement, the tiles have a uniform row length, preferably corresponding to the bit length of the register of a hardware module with which the method is implemented. The row length amounts to 8, 16, 32, 64 or 128 bits or an additive combination thereof. In a preferred development, for determining whether a tile contains dither cells at least with the lowest gray scale value corresponding to a model dither cell, a comparison cell is employed that contains only these model dither cells and whose length at least corresponds to the row length of a tile; and the comparison is implemented tile row by tile row. Furthermore, the length of the comparison row amounts to the smallest common multiple of row length of the tile and row length of the dither cell, which preferably has an 8×8 or 10×10 picture element matrix. An additional advantage is realized when a comparison row with appertaining model dither cells is employed for each gray scale value.

In one embodiment, neighboring tiles having a prescribed gray scale value corresponding to a model dither cell are combined to form a polygon; and the characteristic data of this polygon are transmitted, preferably compressed, for further processing of the image raster data. The polygon is either a square or a rectangle, for example. Specifically, the tiles combined to form a rectangle have a common minimal gray scale value; and the characteristic data of this rectangle are transmitted. The rectangle can contain a sub-rectangle whose tiles have a minimum gray scale value that is higher than the gray scale value of the tiles of the rectangle. In particular, a list of rectangles is produced; and characteristic data of this list are transmitted, preferably in compressed form. The list is organized such that rectangles with descending plurality of tiles assume a descending rank in the list; and only those rectangles from this list whose plurality of tiles exceeds a predetermined value are transmitted for further processing. The number of rectangles of the list is limited to a predetermined value.

In one further improvement, the dither cells of a row or of a sequence that adjoin a rectangle and have the same minimum gray scale value as the dither cells of the rectangle are incorporated into the expanded rectangle, whereby the boundaries of the rectangles are correspondingly expanded. Preferably, the position of the upper left corner, the height, the width and the gray scale value are determined for each rectangle with reference to a page, and these characteristic data are transmitted, preferably in compressed form.

The raster image data of the marked tiles or of the marked rectangles can be removed from the data stream by subtraction; and the remaining data stream compressed according to a standardized compression method and transmitted. For example, the FAX G4 compression method is employed as standardized compression method. The data of the marked tiles or of the rectangles may be transmitted according to the SPDS data format. As a variation, the transmitted image raster data as re-compiled upon employment of an OR function.

In the method, an RIP module, preferably a POSTSCRIPT converter module is employed for generating the data stream of image raster data from language elements of the graphics language. The present method may be employed for the transmission of print raster data to printers, preferably to high-performance printers. By way of definition, one example of the high-performance printer has a printing output greater than equal to 400 pages DIN A4 per minute at 600 dpi.

The present invention also provides a system for compressing and transmitting image raster data, including an RIP module that generates a data stream of image raster data page-by-page from language elements of a graphics language, the data stream containing gray image areas in the form of dither cells whose gray scale values are determined by model dither cells, the image raster data of each and every page being divided into tiles of a two-dimensional grid network, each tile including a plurality of image raster data, wherein the appertaining model dither cell and the gray scale value thereof are identified for each tile that contains only dither cells and this tile is marked; and characteristic data of the marked tiles are transmitted for further processing of the image raster data, whereby these characteristic data contain information about the position of the respective tile and the respective gray scale value. For example, the dither cells contain rectangularly or quadratically arranged picture elements; and the model dither cell with higher gray scale value at least contains inked picture elements at the same positions as the model dither cell with the next-lower gray scale value. In one embodiment, the system has neighboring tiles with predetermined gray scale value corresponding to a model dither cell are combined to form a polygon; and characteristic data of this polygon are transmitted, preferably compressed, for further processing of the image raster data. The invention provides that the polygon is a square or a rectangle.

In a further method for compressing and transmitting image raster data, a data stream of image raster data is generated page-by-page from language elements of a graphics language, the data stream containing gray picture elements in the form of dither cells whose gray scale values are defined by model dither cells, at least one area is determined that contains only dither cells, whereby the appertaining model dither cell and the gray scale value thereof is identified and this area is marked; and characteristic data of the marked area are transmitted for further processing of the image raster data, whereby these characteristic data contain information about the position of the respective tile and the respective gray scale value. A preferred development provides that the dither cells contain rectangularly or quadratically arranged picture elements; and the model dither cell with higher gray scale value at least contains inked picture elements at the same positions as the model dither cell with the next-lower gray scale value. The dither cells of a rectangular region have a common minimum gray scale value. A list of rectangles can be produced; and the characteristic data of this list are transmitted, preferably in compressed form.

According to the invention, a computer program product includes a computer-readable medium with which commands are offered in encoded form, these, after the loading of the computer program, causing the computer to implement the steps set forth above. A computer program element may also be provided comprising commands in encoded form that cause the computer to implement the foregoing steps. The computer program element is preferably present on a computer-readable medium. The invention also provides a computer-readable medium that contains a computer program which causes a computer to implement the above set-forth steps.

According to the invention, the image raster data of each and every page are divided into tiles, for example tiles of an identical size, of a two-dimensional grid network. A determination is made for every tile as to whether it exclusively contains dither cells or not. When the former applies, the appertaining model dither cell and the gray scale value thereof are determined and this tile is marked. When the tile does not exclusively contain dither cells, for example non-inked white parts, then this tile is not further-analyzed. The image raster data of such a tile is compressed according to traditional compression methods. Characteristic data, for example about the size and the gray scale value, are identified from the marked tiles, and these characteristic data are transmitted as compressed data. The image raster data of such marked tiles need not be compressed according to the traditional compression methods, i.e. they are bracketed out in the traditional compression method. In this way, the traditional compression method can compress a page faster and with higher efficiency since, on the one hand, the compression of marked tiles and, on the other hand, the considerable compression outlay for dither cells are eliminated. According to the inventive method, an added outlay is in fact required overall for the analysis of the tiles and the transmission of the characteristic data of marked tiles. This added outlay, however, is slight compared to the saving in compression outlay for the standardized compression method.

According to a further aspect of the invention, a system for compressing and transmitting image raster data has comprising an RIP module that generates a data stream of image raster data page-by-page from language elements of a graphics language, the data stream containing gray image areas in the form of dither cells whose gray scale values are determined by model dither cells, whereby the image raster data of each and every page are divided into tiles of a two-dimensional grid network, whereby each tile comprises a plurality of image raster data, the appertaining model dither cell and the gray scale value thereof are identified for each tile that contains only dither cells and this tile is marked; and characteristic data of the marked tiles are transmitted for further processing of the image raster data, whereby these characteristic data contain information about the position of the respective tile and the respective gray scale value. This system has the technical advantages already described above in conjunction with the method.

Further, a method for compressing and transmitting image raster data is provided whereby a data stream of image raster data is generated page-by-page from language elements of a graphics language, said data stream containing gray picture elements in the form of dither cells whose gray scale values are defined by model dither cells, characterized in that at least one area is determined that contains only dither cells, whereby the appertaining model dither cell and the gray scale value thereof is identified and this area is marked; and characteristic of data of the marked area are transmitted for further processing of the image raster data, whereby these characteristic data contain information about the position of the respective tile and the respective gray scale value. Given this method, at least one area is identified that contains only dither cells that agree with a pre-defined model dither cell and a gray scale value. The characteristic data of this area are transmitted for further-processing of the image raster data.

According to a further aspect of the invention, a computer program product, a computer program element and a computer-readable medium are provided. The computer program product and the computer program element contain commands and data for the control of a computer. After the loading of the computer program product or, respectively, of the computer program element that, for example, is loaded as a software module either individually or together with other software modules, the method steps defined in the claims are implemented when the commands are processed and the technical result is achieved. A diskette, a magnetic or optical storage disk (CD ROM), a data carrier tape or a remote memory can be employed as a computer-readable medium, a computer program being transmitted and loaded therefrom by remote data transmission, for example via the Internet.

BRIEF DESCRIPTION OF THE DRAWINGS

An exemplary embodiment of the invention is explained below on the basis of the drawings.

FIG. 7 is an illustration of the combining of tiles to form rectangles.

FIG. 8 is an illustration of the deletion of a rectangle.

DETAILED DESCRIPTION OF THE PREFERRED EMBODIMENTS

Figure 1A:
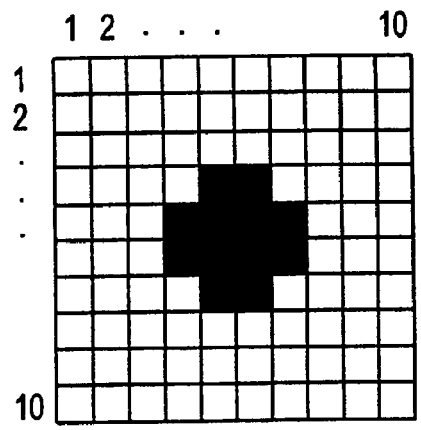
FIGS. 1A and 1B are illustrations of model dither cells with overlap of the inked picture elements.
Figure 1B:
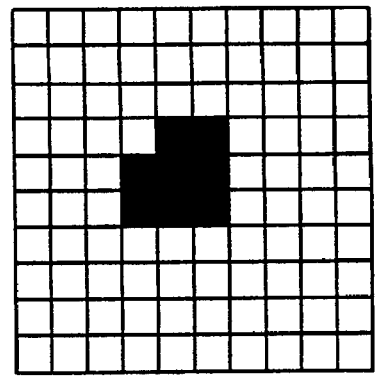

FIGS. 1A and 1B show the structure of two model dither cells A and B. Both model dither cells A and B have 10 times 10 picture elements, i.e. the row length amounts to 10 picture elements and the column length likewise amounts to 10 picture elements. The model dither cell A contains black-colored picture elements in the middle in the fashion of a cross. The model dither cell B contains black-colored picture elements in the middle that together yield an L pointing to the left. The model dither cell B contains fewer black-colored picture elements than the model dither cell A. Accordingly, the gray of the model dither cell B is lighter than the gray of the model dither cell A. This means that the gray scale value of the model dither cell B is lower than the gray scale value of the model dither cell A. It is generally true for the arrangement of the black-colored picture elements of model dither cells that the model dither cell with the higher gray scale value contains inked picture elements at least at identical positions as the model dither cell with the next-lower gray scale value. This means that inked picture elements of model dither cells with a higher gray scale value overlap the inked picture elements of model dither cells with a lower gray scale value. In FIG. 1A, the darker model dither cell A has black-colored picture elements at identical positions as the model dither cell B in FIG. 1B. In addition, further picture elements are colored black in the model dither cell A.

Theoretically, a plurality of gray scale values can be realized with the assistance of a plurality of model dither cells in the fashion of the model dither cells A and B shown in FIGS. 1A and 1B, whereby the lowest gray scale value is defined by a single black-colored picture element, and the highest gray scale value is present when all picture elements of the dither cell are colored black. In practice, a smaller plurality of gray scale values than the theoretically possible plurality and a correspondingly reduced plurality of model dither cells are employed, for example 16 or 32. In this example, the gray scale value then has a value range from 1 through 16 or, respectively, 1 through 32. An extreme gray scale value 0 means that none of the picture elements is colored black; in this respect, this is not a dither cell but a Q white, unprinted surface. Let it also be pointed out that two types of dither cell that have either 10 times 10 picture elements or 8 times 8 picture elements in a matrix arrangement dominate in practice.

Figure 2:
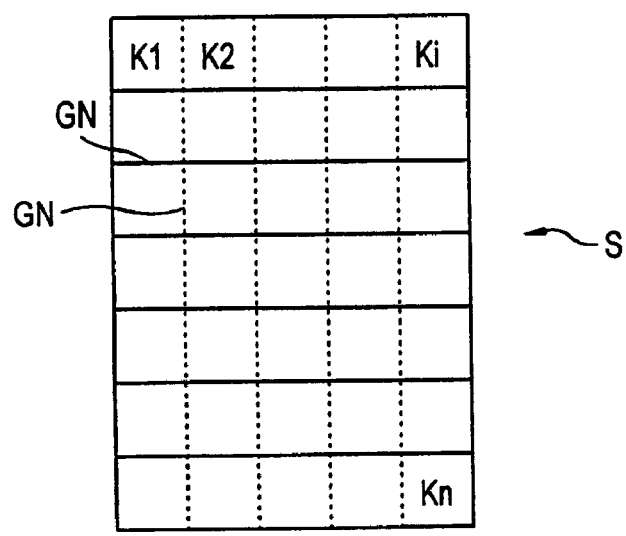
FIG. 2 is a diagram showing the division of a page into tiles with the assistance of a grid network

FIG. 2 schematically shows the division of a page S into identically sized tiles K1, K2, Ki through Kn of a two-dimensional grid network GN Each tile K contains a plurality of image raster data in data lines of equal length. Within a tile row K1 through Ki, the tiles are processed from left to right in the search algorithm that shall be subsequently described; the tile rows are processed from top to bottom. However, some other processing sequence is also conceivable.

Figure 3:
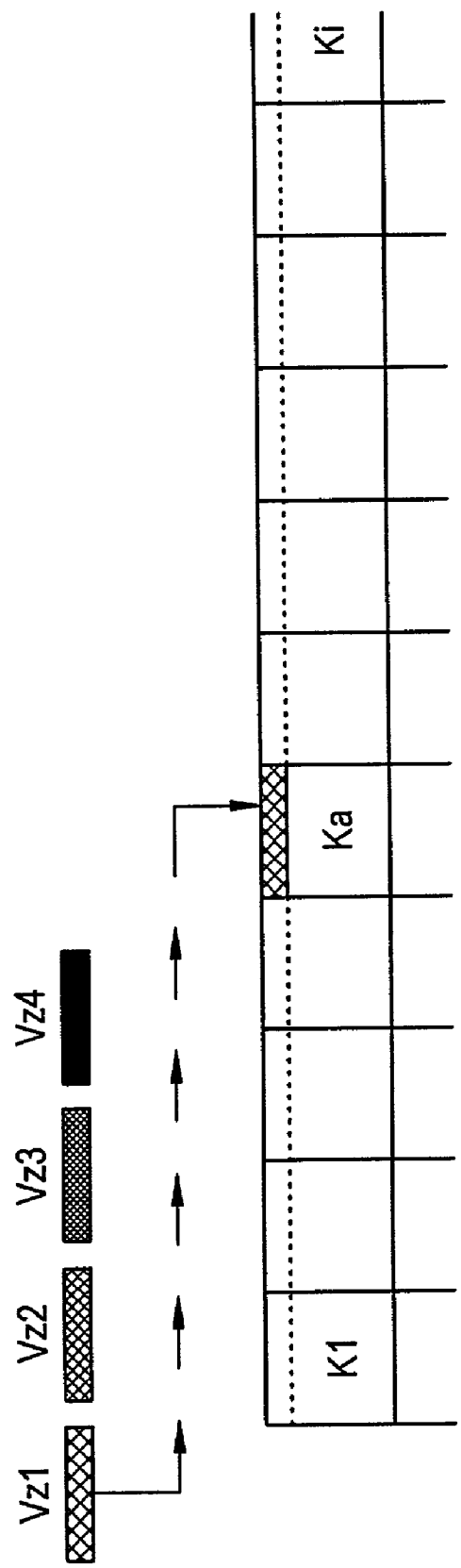
FIG. 3 is a schematic illustration of a search algorithm upon employment of comparison lines composed of tiles.

FIG. 3 schematically shows the procedure for determining dither cells that are contained in a tile Ka. First, comparison rows Vz1, Vz2, Vz3 and Vz4 are offered that have at least the same row length as the tiles K1 through Kn. For greater clarity, only four comparison rows Vz1 through Vz4 are employed. In practice, just as many comparison rows are offered as there are gray scale values defined by the model dither cells. Each comparison row Vz1 through Vz4 contains identical model dither cells with a specific gray scale value. The comparison row Vz1 contains model dither cells with a gray scale value G=1, the comparison row Vz2 contains model dither cells with a gray scale value G=2, the comparison row Vz3 contains model dither cells with a gray scale value G=3, and the comparison row Vz4 contains model dither cells with a gray scale value G=4. Comparison row Vz1 thus contains the fewest black-colored picture elements. The comparison row Vz2 with the next higher gray scale value G=2 contains black-colored picture elements of the model dither cell with the gray scale value G=1 at the same raster positions and additional black-colored picture elements. The model dither cells of the comparison row Vz3 having the next-higher gray scale value G=3 contains the black-colored picture elements of the model dither cells of the comparison rows Vz1 and Vz2 at the same positions as well as additional black-colored picture elements. The similar case applies to the model dither cells of the comparison row Vz4.

Due to the overlap of the inked picture elements of the model dither cells of the comparison row Vz1 through Vz4, it suffices for locating dither cells in the various tiles when a coincidence of the first row of each and every tile K with the comparison row Vz1 is merely found in the first search step, as schematically shown in FIG. 3 on the basis of the tile Ka. Tiles such as, for example, the tile Ki that already do not coincide with the comparison row Vz1 in their first row are no longer taken into consideration in the rest of the process. Such tiles are assigned the extreme gray scale value G=0, i.e. they due not generally contain dither cells in the first row that coincide with the model dither cell having the gray scale value G=1. The search for tiles within a page that have dither cells with at least the gray scale value G=1 thus ensues very fast when the tile size is selected appropriately large. It can already be seen here that the method of the invention works very fast due to the division according to tiles.

Figure 4:
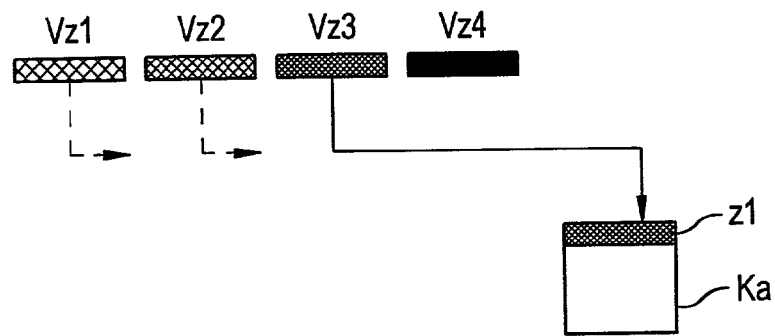
FIGS. 4, 5 and 6 are schematic illustrations of a search algorithm for fixing the gray scale value of a tile.

FIG. 4 schematically shows the next step, whereby what actual gray scale value G the first row z1 of the tile Ka is determined within the tile Ka by comparison to the comparison rows Vz1 through Vz4. In the present case, it is found that there is coincidence between comparison row Vz3 and the first row z1 of the tile Ka, i.e. the gray scale value is G=3.

Figure 5:
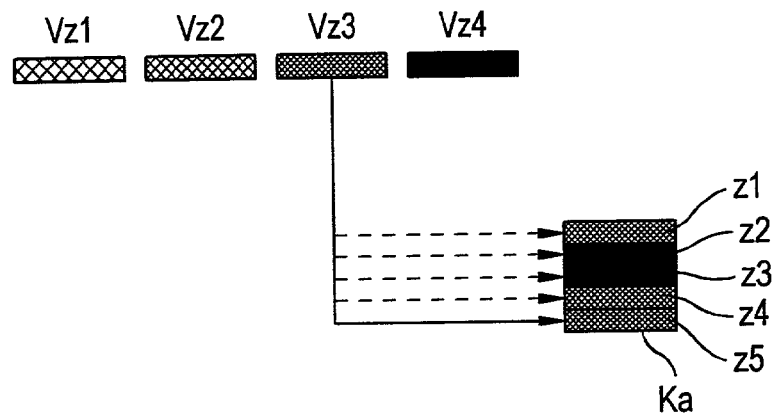

FIG. 5 schematically shows the next step wherein a finding is made within the tile Ka as to whether at least all rows z1 through z5 with dither cells contains the gray scale value G=3 that had been found in the preceding step (FIG. 4). In the present case, all rows z1 through z5 of the tile Ka contains at least the gray sale value G=3 in conformity with the comparison row Vz3. Two rows z2 and z3 have a higher gray scale value G>3, i.e. are darker. This is allowed since model dither cells with a higher gray scale value have colored the same picture elements black as model dither cells with a lower gray scale value. When, however, the gray scale value G is lower than found in the first row z1, then a branch is made to the next step, which is schematically shown in FIG. 6.

Figure 6:
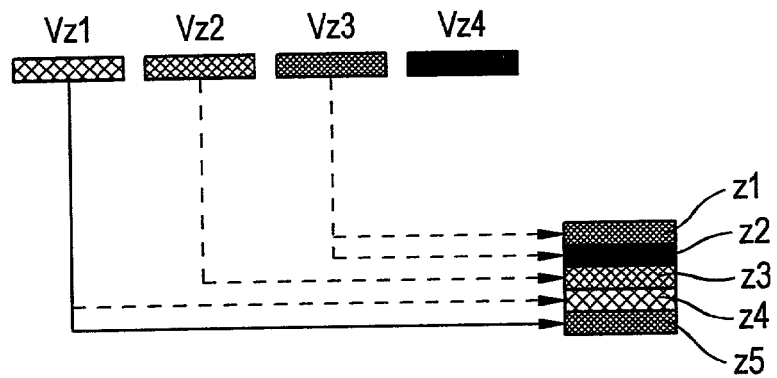

It is shown in FIG. 6 that the row z3 coincides with the comparison row Vz1, i.e. has the lowest gray scale value G=1. In this case, the entire tile Ka has the gray scale value G=1 allocated to it since this gray scale value G is at least also contained in all other rows z1 through z5 of the tile Ka. If, however, a gray scale value were found in a row that does not coincide with a model dither cell, for example the extreme gray scale value G=0 (which means that no comparison row fits), then the value G=0 is assigned to this tile and it is no longer taken into consideration in the continuing process.

It is to be pointed out that the comparison rows Vz1 through Vz4 that have dither cells arranged in them in row form in turn contain picture element rows. In practice, the comparison of the comparison rows Vz1 through Vz4 to dither cells of the tile Ka is implemented on the basis of such picture element rows. Instead of comparison rows Vz1 through Vz4, comparison tiles can also be employed whose size corresponds to the tile Ka and that contain a plurality of rows of dither cells.

FIG. 7 schematically shows a part of a page with tiles K to which gray scale values G=0, 1, 2 or 3 have been assigned. This assigning of gray scale values corresponds to a marking. The value G=0 means that no standard gray scale value was capable of being found for this tile, for example because such a tile does not generally contain dither cells with the lowest gray scale value (gray scale value G=1).

The tiles shown in FIG. 7 are investigated tile row by tile row from left to right. Tiles having the value G=0 are not taken into consideration. Tiles lying next to one another having the same value, in this case the gray scale value G=3, are combined to form a rectangle Ra. In this way, larger areas of the page S having the same gray picture elements are combined.

Another modification in the search for rectangles provides that tiles that contain the same gray scale value (for example, gray scale value G=1) or a higher gray scale value (for example, gray sale value G=2 or G=3) are combined to form rectangles. The rectangle Rb shows the combination of 6 tiles that contain the gray scale values G=1 or G=2. Such a combination is expedient since dither cells with gray scale value G=2 have black-colored picture elements at the same positions as dither cells with gray scale value G=1, as already explained above. Overall, the gray scale value G=1 is assigned to the rectangle Rb, i.e. the lowest gray scale value G within the rectangle Rb. An excess of black-colored picture elements thus remains for the tiles with gray scale value G=2. This excess derives when dither cells with gray scale value G=1 are subtracted from all dither cells of the rectangle Rb in a subtraction step. These excess picture elements are compressed as image raster data according to the traditional standard compression method and are transmitted.

FIG. 8 shows the further treatment of the rectangle Ra within the image raster data of a page S. The position of the upper left corner of the rectangle Ra is identified as characteristic data for the rectangle Ra. Further, the height and width as well as the gray scale value G, the gray scale value G=3 in this case, are identified. These characteristic data are entered into a list of rectangles that lists further rectangles of the type of rectangle Ra. Subsequently, the rectangle Ra within the page S is cleaned, i.e. the value G=0 is assigned to the tiles of the rectangle Ra, so that these tiles are no longer taken into consideration in the search for further rectangles. The analysis of the page S has been ended, when the entire page S has been searched for tiles that can be combined to form rectangles and the characteristic data of the rectangles have been entered into the list.

The list of rectangles can be sorted in a next step. Rectangles having a decreasing number of tiles are given a decreasing rank in the list. Only those rectangles whose number of tiles exceeds a predetermined value are then selected from this list and their characteristic data separately transmitted. In this way, only gray picture elements that are contained in large-area rectangles are separately transmitted. The efficiency of the compression method is further enhanced as a result thereof. A decision to discard a rectangle can already be made during the process of forming rectangles in this case and, thus, the discarded tiles can be made available in the formation of other rectangles. The efficiency of the compression method is further enhanced as a result thereof.

Another modification can be comprised therein that the number of rectangles of the list is limited to a predetermined value. Since the transmission of the characteristic data of rectangles means an additional compression outlay and this outlay increases given a great number of rectangles, it is expedient to limit this number.

Figure 9:
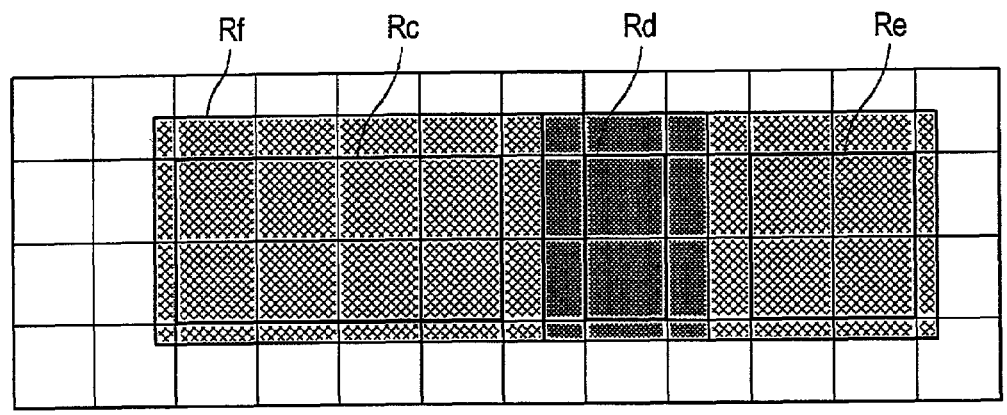
FIG. 9 is a schematic showing of an expansion possibility for a rectangle.

FIG. 9 shows a further modification of the formation of rectangles whose boundaries need not coincide with tile boundaries. When, as shown in FIG. 7, tiles have been combined to form rectangles, then the boundaries of these rectangles coincide with tile boundaries. When, however, dither cells with the same gray scale value as those within a rectangle adjoin such a rectangle in terms of row or column and have the same minimum gray scale value G as the dither cells of the rectangle, then these dither cells can be co-incorporated into the rectangle. The height and width of the respective rectangle must then be correspondingly increased. The boundaries of the rectangles are thus enlarged to the same extent as the identical gray raster actually occurs as a rectangle in the original of a page S. The efficiency of the inventive compression method is further enhanced in this way.

FIG. 9 shows three rectangles Rc, Rd, Re with solid boldface lines. The rectangles Rc and Re have a gray scale value G=2. The rectangle Rd has a gray scale value G=4. Dither cells whose gray scale values G agree with those of the respective rectangles adjoin the rectangles Rc, Rd, Re. The individual rectangles Rc, Rd and Re can be correspondingly enlarged in their respective height and length. Over and above this, it is possible to combine all enlarged rectangles to form a single rectangle Rf. This rectangle Rf then has the minimum gray scale value of all enlarged rectangles Rc, Rd and Re, namely the gray scale value G=2. In FIG. 9, Rd is a subrectangle with G=4 within the overall rectangle Rf with G=2. The overall gray scale value is G=2, this being transmitted as characteristic datum for the rectangle Rf. It is also possible to employ an inverse presentation for which the gray scale value G=4 is transmitted as a characteristic datum for the rectangle Rf. During further processing of the image data, the reduced gray scale value G=2 is then to be taken into consideration for the further rectangles Rc and Re.

Figure 10:
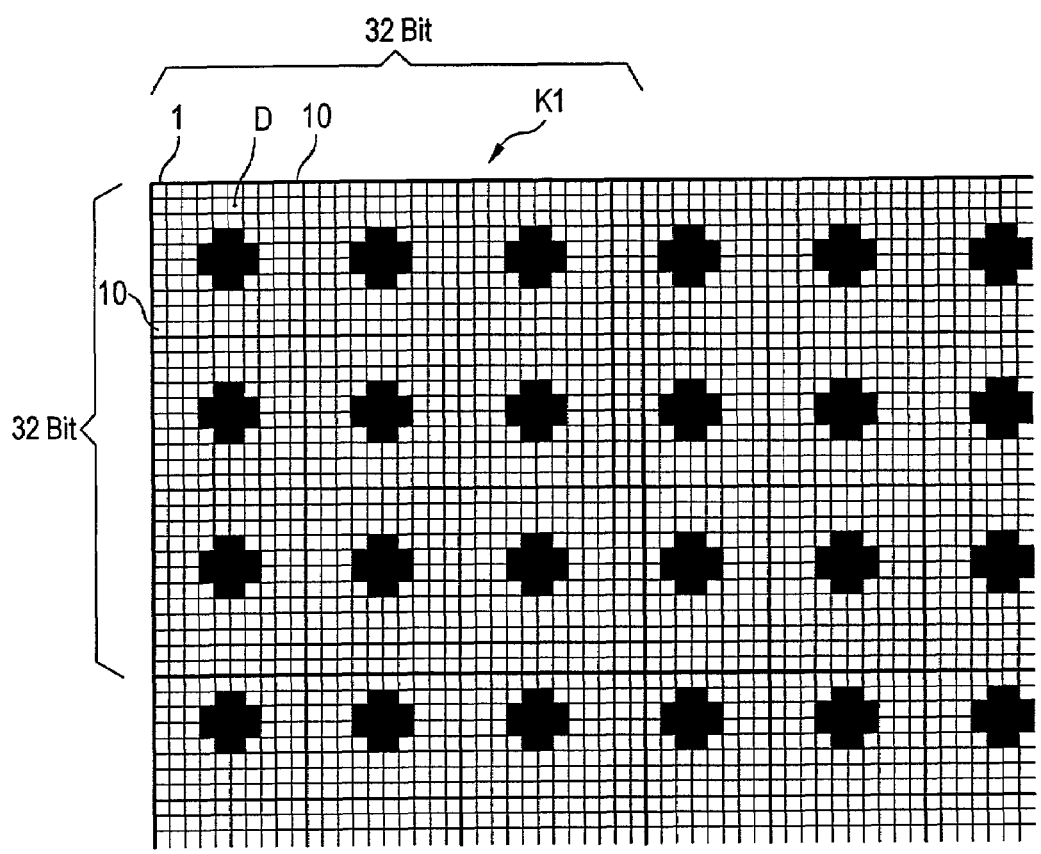
FIG. 10 is a schematic showing of the fixing of the bit length of a comparison line.

FIG. 10 shows another modification wherein the size of the dither cells and the row length as well as the column length of a tile are taken into consideration. Usually, dither cells have an 8×8 or a 10×10 picture element matrix. The bit width of the registers of the computer hardware employed for realizing the inventive method is preferably suited as row length for a tile. Row lengths of 8, 16, 32, 64 or 128 are customary. An additive combination of the row lengths is likewise possible, for example an overall row length composed of the combination of 8 bits+32 bits=40 bits, etc. Since the row length of the dither cells need not coincide with the row length of the tiles, it is expedient that the aforementioned comparison rows Vz1 through Vz4 have a length corresponding to the smallest common multiple of the row length of the tiles and the row length of the dither cells D. In the example of FIG. 10, the dither cells D have a row and column length of 10. The tiles, for example the tile K1, have a row and column length of 32 bits, i.e. the tile K1—in terms of length and width—comprises 3 dither cells as well as 2 columns or, respectively, rows of the next, adjacent dither cells. The smallest common multiple of row length of the tile K1 and row length of the dither cell D amounts to 160 bits. It is therefore expedient to equip the comparison rows Vz1 through Vz4 with a row length of 160 bits. Given a register width of 32 bits, a comparison within a tile row of 5 tiles, i.e. 16 dither cells, can be simultaneously implemented in this case with the assistance of 5 double word operations. Such double word operations can be executed very fast with the assistance of registers.

Figure 11:
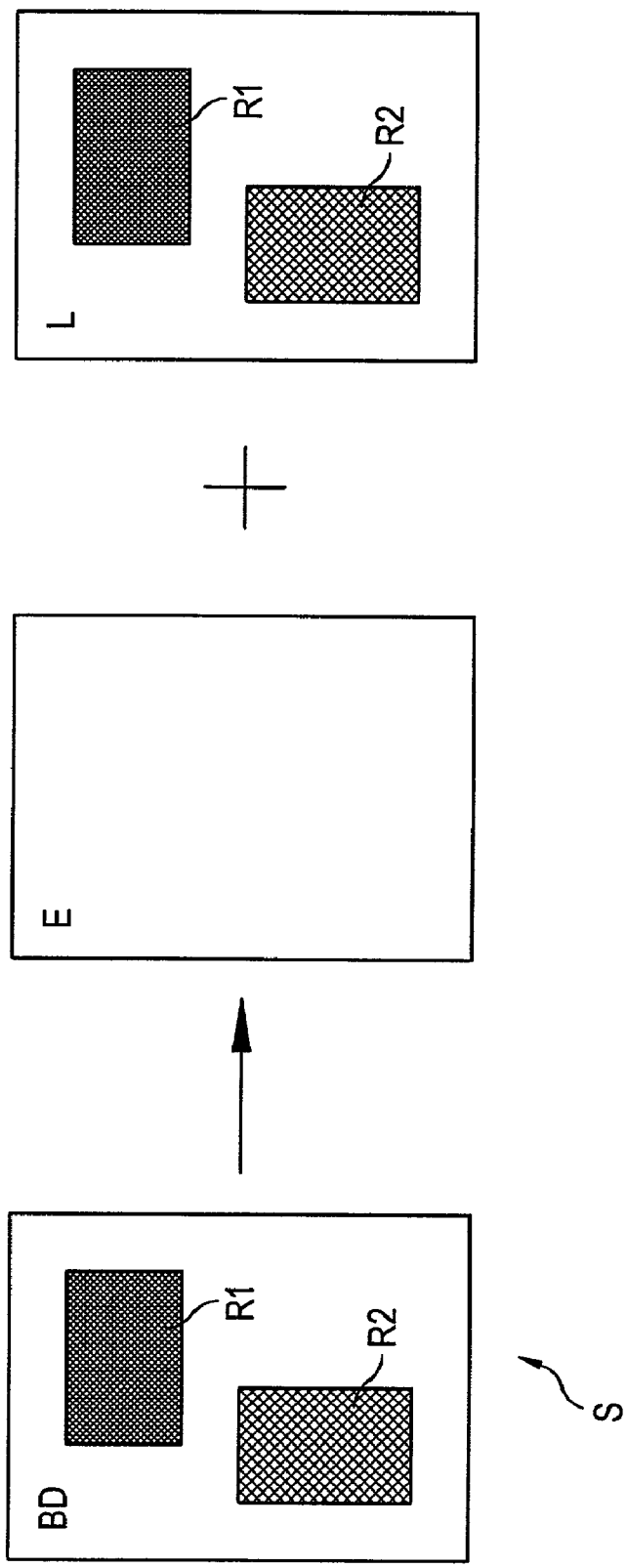
FIG. 11 is a flow diagram of the transmission of the image raster data upon employment of the inventive method.

FIG. 11 shows the principle of the invention employed for compressing and transmitting the image raster data. The image raster data BD of a page S generated by the RIP module are analyzed according to the aforementioned method steps and rectangles R1 and R2 with identical dither cells are thereby identified. These two rectangles R1 and R2 on the page S are blanked out from the overall image raster data BD, for example with a subtraction method. The remaining image raster data E are transmitted according to a traditional standard compression method, for example according to the FAX G4 compression method. However, other compression methods are conceivable, for example those that work according to the run length encoding method. The characteristic data of the rectangles R1 and R2 are separately transmitted, whereby a list L of rectangles is preferably employed and only these list data are transmitted. At the receiver side, the data that have been transmitted according to the standard compression method as well as the image raster data BD of the rectangles R1 and R2 are re-compiled. In this way, not all image raster data BD of the page S need be compressed according to the standard compression method and transmitted, but only the data E, i.e. with the exception of the rectangles R1 and R2. It is to be pointed out that not all gray picture elements with identical dither cells need be combined to form rectangles. For an improved reduction of the data stream to be transmitted and of the processing time in the compression, it suffices when approximately 80 to 90% of all identical dither cells are covered.

Figure 12:
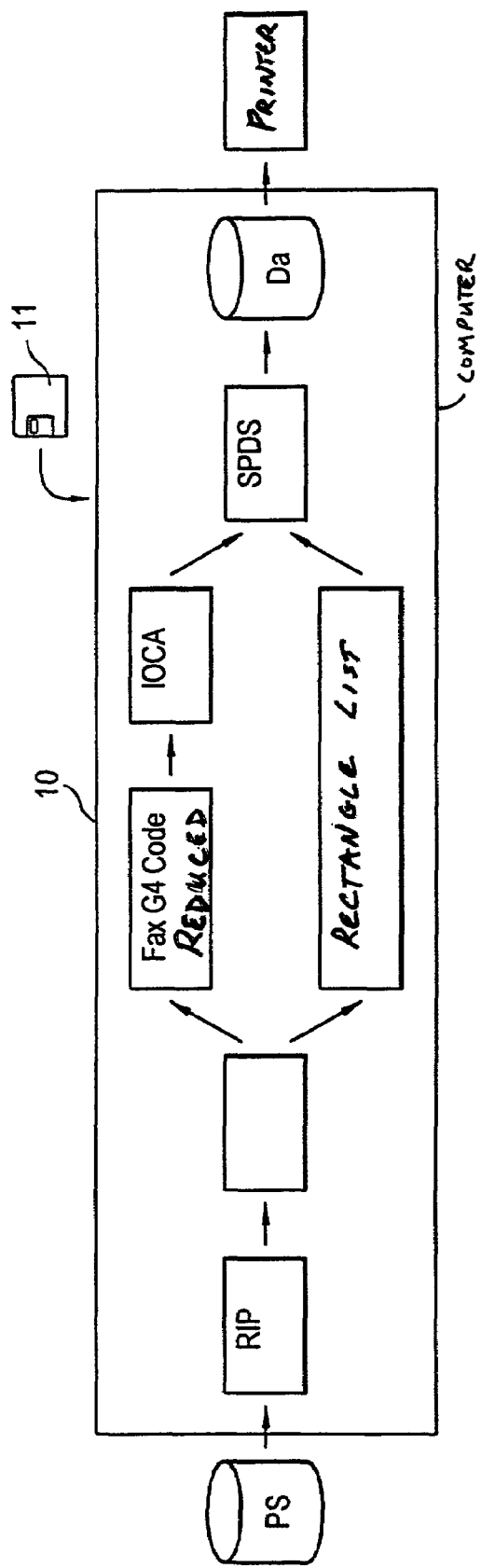
FIG. 12 is a illustration of the inventive method in a block diagram.

FIG. 12 shows a block diagram of a schematic illustration of the inventive method or, respectively, of the inventive system. In a computer 10, an RIP module RIP generates image raster data from language elements of the printer language POSTSCRIPT PS that are investigated in the computer 10 with a corresponding computer program according to the above-described analysis steps, these corresponding to a filter function in a raster filter. Using a diskette 11, the computer program can have been loaded into the computer 10 on a permanent storage (hard disk) or into a volatile main memory (RAM). The image raster data that still remain per printed page after subtraction of the identified rectangles are compressed in the computer 10 according to the FAX G4 compression method and are packed according to the data formats IOCA and/or SPDS. The data format IOCA is described in the IOCA reference manual, "Image Object Content Architecture" Reference, $4^{th}$ Edition (August 1993) SC31-6805-03, International Business Machines Corporation. The data format SPDS is described in the SPDS reference manual "SPDS", Edition of 11.94, U 9737-J-Z247-3, Océ Printing Systems GmbH. Both documents are herewith incorporated by reference into the disclosure of the present application.

The data with a high packing density are stored in a datafile Da in a volatile or permanent memory, particularly in the computer. The list of rectangles determined in the filtering steps is packed with high packing density according to the data format SPDS and is likewise stored in the datafile Da. The generation of the compressed data can be accelerated with the assistance of the filter function, i.e. an abbreviated time is needed for the editing of the data. The printer accesses the datafile Da, whereby the data volume to be transmitted to the printer is small due to the high packing density and the high informational content. An adequately great quantity of data can thus be transmitted with a given data transmission rate. This means that the printer, as a high-performance printer with a high printing output, is adequately supplied with image raster data even given printed pages with many identical, gray picture areas and can print interruption-free at a high printing speed. The printer likewise Q contains a computer or a controller with a decompression program with the assistance of the data of the datafile Da are converted into further-processable print data. Preferably, the decompression program contains an OR function with which the image raster data of the rectangles and the image raster data that are transmitted in a traditional way are combined to form common image raster data.

Figure 13:
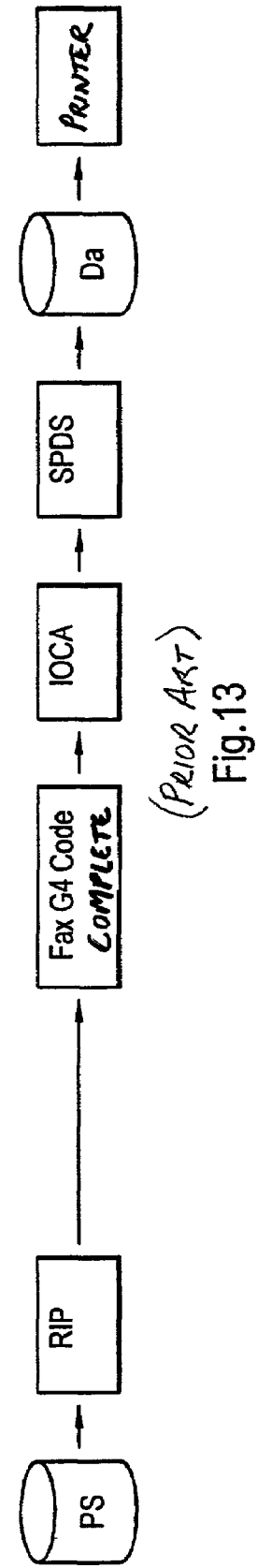
FIG. 13 is a block diagram of a traditional method for compressing and transmitting image raster data according to the Prior Art.

FIG. 13 shows the structure of a traditional system. The image raster data of the RIP module are compressed exclusively according to a standard compression method, for example the FAX G4 compression method and are then stored in a datafile Da as data with a high packing density, being stored with the assistance of the IOCA and/or SPDS data format. Since many data arise for each identical gray picture element, the memory requirement for the datafile Da is very high. Likewise, the compression algorithms for compressing the corresponding image raster data for identical gray picture elements are extensive and time-consuming. During printing, the printer accesses the data in the datafile Da. Since a considerable data volume is to be processed but the data transmission rate from the datafile Da to the printer is limited, it can occur that the printer can print faster than data can be offered via the datafile Da. A brief stoppage of the printing event occurs in this case. Such a start-stop operation, however, is extremely disruptive for a high-performance printer; it performance capability is only inadequately used. Typically, such a high-performance printer has a printing output greater than 400 pages DIN A4 per minute given a resolution of 600 dpi (dots per inch).

Figure 14:
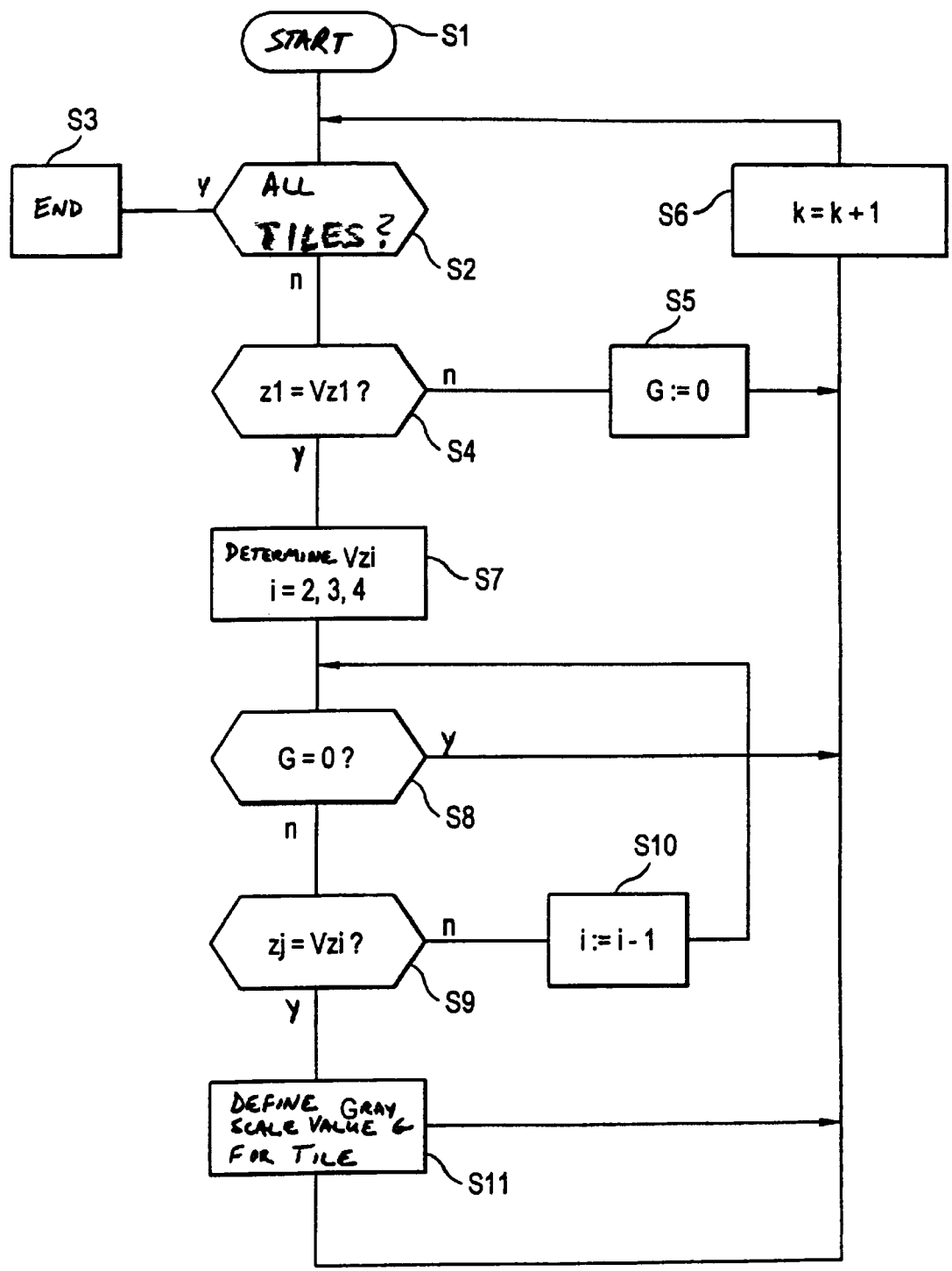
FIG. 14 is a flowchart with method steps for allocating gray scale values to tiles.

Using a flowchart, FIG. 14 schematically shows method steps as were already explained in FIGS. 3 through 6. These method steps serve the purpose of determining a gray scale value G=0 or a higher gray scale value G for a tile K. As mentioned, a gray scale value G=0 is assigned when a row z of a tile K contains no gray picture element, i.e. no dither cell. FIG. 14 only shows critical steps that serve the purpose of explaining the fundamentals of the method. Required intermediate steps, for example the definition of initial conditions for run variables, the modification of run variables, etc., are familiar to a person skilled in the art active in this field.

After the start (step S1), a check is carried out in step S2 whether all tiles K of a page have already been processed. When this applies, then the entire step sequence for a page is ended in step S3. When all tiles K have not yet been processed, then a check is carried out in the following step S4 whether the appertaining tile K has its first row z1 coinciding with the comparison row Vz1 that, as mentioned, has the lowest gray scale value G=1. When no coincidence is found, then the extreme gray scale value G=0 is assigned to this tile K in step S5 and a branch is made to step S6. In this step S6, the tile run variable k is incremented by 1 and a branch is made to step S2.

When it is found in step S4 that the first row z1 coincides at least with the comparison line Vz1, then a determination is made in the next step S7 as to whether there are comparison rows Vz2, Vz3 and Vz4 with a higher gray scale value G that coincide with the first row z1. The comparison row Vzi (i is a run variable) with the highest gray scale value G is then further-employed. The following step S8 is explained later. In the step S9 following thereupon, a determination is made for every row zj (wherein j is a run variable for the row number) of the same tile K as to whether it coincides with the comparison row Vzi found in step S7. When this does not apply, then the run variable i is lowered by 1 in step 510, i.e. a comparison row Vzi with the next-lower gray scale value G is employed for the further analysis. Whether the extreme gray scale value G=0 is reached is then found in step S8. When this applies, then a branch is made to step S6 and the next tile K is analyzed. The gray scale value G=0 means that a white picture element to which no gray scale value can be assigned occurs within the tile K.

In step S11, the gray scale value G for the appertaining tile K is then determined. This gray scale value G states that dither cells of at least this gray scale value G are present in all rows zj of this tile. A higher gray scale value G is possible.

Although other modifications and changes may be suggested by those skilled in the art, it is the intention of the inventors to embody within the patent warranted hereon all changes and modifications as reasonably and properly come within the scope of their contribution to the art.

The invention claimed is:

1. A method for compressing and transmitting image raster data of pages, comprising the steps of:
   generating a data stream of image raster data from language elements of a graphics language, said data stream containing gray image areas in a form of dither cells whose gray scale values correspond to model dither cells;

dividing said image raster data of each one of pages into tiles of a two-dimensional grid, each of said tiles include a plurality of said image raster data;

identifying ones of said tiles that contains only dither cells, and marking said tiles that contains only dither cells to produce marked tiles;

identifying position data and gray scale values and corresponding model dither cells for said marked tiles as characterizing data for said marked tiles, and transmitting said image raster data of pages including transmitting said characteristic data of said marked tiles for printing of said image raster data without transmitting image raster data of said marked tiles having gray scale values of a predetermined model dither cell.

2. A method as claimed in claim 1 wherein said dither cells include picture elements that are arranged one of rectangularly and quadratically; and wherein said model dither cell with a higher gray scale value at least contains inked picture elements at same positions as said model dither cell with a next-lower gray scale value.

3. A method as claimed in claim 2, further comprising the step of:

checking each of said tiles to see whether said tiles contain dither cells of a type of said model dither cell with a lowest gray scale value.

4. A method as claimed in claim 3, wherein said step of checking includes checking tiles tile row by tile row; and further comprising the step of investigating a first row of dither cells of each tile before investigating subsequent rows of dither cells of the tile; and, given a lack of coincidence, the appertaining tile is investigated no further.

5. A method as claimed in claim 3, further comprising the step of:

determining said model dither cell with a highest gray scale value that is contained in all dither cells of a tile for the tile that contains dither cells of a type of said model dither cell with said lowest gray scale value, said model dither cell with the highest gray scale value that is contained in all dither cells of the tile being said predetermined model dither cell; and assigning a gray scale value of said model dither cell to said tile.

6. A method as claimed in claim 1, wherein said tiles have a uniform row length.

7. A method as claimed in claim 6, wherein said uniform row length corresponds to a bit length of a register of a hardware module with which the present method is implemented.

8. A method as claimed in claim 6, wherein said uniform row length amounts to one of 8, 16, 32, 64 and 128 bits or an additive combination thereof.

9. A method as claimed in claim 8, further comprising the step of:

comparing using a comparison row that contains only said model dither cells and whose length at least corresponds to said uniform row length of a tile so as to determine whether a tile contains dither cells at least with said lowest gray scale value corresponding to said model dither cell; and implementing said comparing step tile row by tile row.

10. A method as claimed in claim 9, wherein the length of said comparison row amounts to a smallest common multiple of row length of a tile and row length of said dither cell.

11. A method as claimed in claim 10, wherein said dither cell has one of an 8×8 and 10×10 picture element matrix.

12. A method as claimed in claim 9, further comprising the step of:

using said comparison row with appertaining model dither cells for each gray scale value.

13. A method as claimed in claim 1, further comprising the step of:

combining neighboring ones of said tiles having a prescribed gray scale value corresponding to one of said model dither cells to form a polygon;

identifying said characteristic data of said polygon; and transmitting said characteristic data of said polygon for further processing of said image raster data instead of transmitting raster data of said polygon.

14. A method as claimed in claim 13, wherein said transmitting step transmits said characteristic data in compressed form.

15. A method as claimed in claim 13, wherein said polygon is one of a square and a rectangle.

16. A method as claimed in claim 15, wherein said combining step combines said tiles to form a rectangle having a common minimal gray scale value; and wherein said transmitting step transmits said characteristic data of said rectangle.

17. A method as claimed in claim 16, wherein said rectangle contains a sub-rectangle whose tiles have a minimum gray scale value that is higher than a gray scale value of the tiles of said rectangle.

18. A method as claimed in claim 16, further comprising the steps of:

producing a list of said rectangles; and transmitting said characteristic data of said list.

19. A method as claimed in claim 18, wherein said transmitting step transmits said characteristic data in compressed farm.

20. A method as claimed in claim 18, further comprising the steps of:

organizing said list such that rectangles with a descending number of tiles assume a descending rank in the list; and transmitting only those rectangles from said list whose number of tiles exceeds a predetermined value for further processing.

21. A method as claimed in claim 18, further comprising the step of:

limiting a number of rectangles of said list to a predetermined value.

22. A method as claimed in claim 16, further comprising the steps of:

expanding boundaries of said rectangles by incorporating into said rectangles any dither cells of one of a row and of a sequence that adjoin a corresponding rectangle and that have a same minimum gray scale value as said dither cells of said corresponding rectangle so as to form expanded rectangles.

23. A method as claimed in claim 16, further comprising the steps of:

determining a position of an upper left corner, a height, a width and a gray scale value for each of said rectangles with reference to said pages as said characteristic data; and transmitting said characteristic data.

24. A method as claimed in claim 23, wherein said transmitting step includes transmitting said characteristic data in compressed form.

25. A method as claimed in claim 16, further comprising the steps of:

marking said rectangles that contain only dither cells to produce marked rectangles;

removing said raster image data of said marked rectangles from said data stream by subtraction; and compressing a remaining image raster data stream according to a standardized compression method and transmitting said remaining data stream.

26. A method as claimed in claim 25, wherein said standardized compression method is a FAX G4 compression method.

27. A method as claimed in claim 16, further comprising the step of:
transmitting data of said rectangles according to an SPDS data format.

28. A method as claimed in claim 1, further comprising the steps of:
removing said raster image data of said marked tiles from said data stream by subtraction; and
compressing a remaining data stream according to a standardized compression method and transmitting said remaining image raster data stream.

29. A method as claimed in claim 28, wherein said standardized compression method is a FAX G4 compression method.

30. A method as claimed in claim 28, further comprising the step of:
recompiling a transmitted image raster data using an OR function.

31. A method as claimed in claim 1, further comprising the step of:
transmitting data of said marked tiles according to an SPDS data format.

32. A method as claimed in claim 1, further comprising the step of:
generating said data stream of said image raster data from language elements of the graphics language using an RIP module.

33. A method as claimed in claim 32, wherein said RIP module is a POSTSCRIPT converter module.

34. A method as claimed in claim 1, further comprising the step of:
transmitting said raster data as print raster data to a printer.

35. A method as claimed in claim 34, wherein said printer is a high-performance printer.

36. A method as claimed in claim 35, wherein said high-performance printer has a printing output of at least 400 DIN A4 pages per minute at 600 dpi.

37. A system for compressing and transmitting image raster data, comprising:
an RIP module that generates a data stream of said image raster data page-by-page from language elements of a graphics language, said data stream containing gray image areas in a form of dither cells whose gray scale values correspond to model dither cells;
a two-dimensional grid network by which said image raster data of each page are divided into tiles, each tile including a plurality of image raster data,
an appertaining model dither cell and a gray scale value thereof are identified for each tile that contains only dither cells and this tile is marked; and
apparatus for transmitting characteristic data of the marked tiles for further processing of the image raster data without transmitting raster image data of marked tiles, said characteristic data including information about a position of the respective tile and a respective gray scale value.

38. A system as claimed in claim 37, wherein said dither cells contain rectangularly or quadratically arranged picture elements; and wherein the model dither cell with a higher gray scale value at least contains inked picture elements at a same positions as the model dither cell with a next-lower gray scale value.

39. A system as claimed in claim 37, further comprising:
a polygon formed by combining neighboring tiles with predetermined gray scale value corresponding to a model dither cell; and
wherein said apparatus for transmitting transmits characteristic data of said polygon for further processing of the image raster data instead of transmitting characteristic data of individual marked tiles of the polygon.

40. A system as claimed in claim 39, wherein said apparatus for transmitting includes an apparatus for transmitting said characteristic data in compressed format.

41. A system as claimed in claim 39, wherein said polygon is one of a square and a rectangle.

42. A method for compressing and transmitting image raster data of pages, comprising the steps of:
generating a data stream of image raster data page-by-page from language elements of a graphics language, said data stream containing gray picture elements in a form of dither cells whose gray scale values correspond to model dither cells;
determining at least one area that contains only dither cells;
identifying an appertaining model dither cell and a gray scale value of said at least one area and marking said at least one area; and
transmitting characteristic data of the marked area for printing of the image raster data without transmitting the raster image data of said at least one area, said characteristic data contain information about a position of the respective tile and the respective gray scale value.

43. A method as claimed in claim 42, wherein said dither cells contain one of rectangularly and quadratically arranged picture elements; and
wherein said model dither cell with a higher gray scale value at least contains inked picture elements at a same positions as said model dither cell with a next-lower gray scale value.

44. A method as claimed in claim 43, wherein said dither cells of a rectangular region have a common minimum gray scale value.

45. A method as claimed in claim 44, further comprising the steps of:
producing a list of said rectangular regions; and
transmitting said characteristic data of said rectangular regions of said list.

46. A method as claimed in claim 45, wherein said transmitting step transmits said characteristic data in compressed form without transmitting and compressing raster image data of said rectangular regions.

47. A computer program product, comprising:
a computer-readable medium on which is stored a computer program having commands in encoded form, said computer program causing a computer to implement the following steps:
generating a data stream of image raster data from language elements of a graphics language, said data stream containing gray image areas in a form of dither cells whose gray scale values correspond to model dither cells;
dividing said image raster data of each one of said pages into tiles of a two-dimensional grid network, each of said tiles include a plurality of said image raster data;
identifying appertaining ones of model dither cells and said gray scale values for each of said tiles that contains only dither cells, and marking said tiles that contains only dither cells to produce marked tiles; and transmitting characteristic data of said marked tiles for further processing of said image raster data without transmitting raster image data of said marked tiles, said characteristic data containing information about a position of a respective one of said tiles and a respective one of said gray scale values.

48. A computer program product, comprising:

a computer-readable medium on which is stored a computer program having commands in encoded form, said computer program causing a computer to implement the following steps:

generating a data stream of image raster data page-by-page from language elements of a graphics language, said data stream containing gray picture elements in a form of dither cells whose gray scale values are defined by model dither cells;

determining at least one area that contains only dither cells;

identifying an appertaining model dither cell and a gray scale value of said at least one area and marking said at least one area; and transmitting characteristic data of the marked area for further processing of the image raster data without transmitting raster image data of the marked tiles have a predetermined gray scale value, said characteristic data contain information about a position of the respective tile and the respective gray scale value.

49. A computer program element stored on a computer readable media and executable on a computer, comprising:

commands in encoded form that cause a computer to implement the following steps:

generating a data stream of image raster data from language elements of a graphics language, said data stream containing gray image areas in a form of dither cells whose gray scale values are determined by model dither cells;

dividing said image raster data of each one of said pages into tiles of a two-dimensional grid network, each of said tiles include a plurality of said image raster data;

identifying appertaining ones of model dither cells and said gray scale values for each of said tiles that contains only dither cells, and marking said tiles that contains only dither cells to produce marked tiles; and transmitting characteristic data of said marked tiles for further processing of said image raster data without transmitting raster image data of marked cells having characteristic data corresponding to a predetermined model dither cell, said characteristic data containing information about a position of a respective one of said tiles and a respective one of said gray scale values.

50. A computer program element as claimed in claim 49, wherein said computer program element is present on a computer-readable medium.

* * * * *